United States Patent
Ohashi et al.

(10) Patent No.: US 10,201,805 B2
(45) Date of Patent: Feb. 12, 2019

(54) EXHAUST GAS PURIFICATION APPARATUS

(71) Applicant: CATALER CORPORATION, Kakegawa-shi, Shizuoka (JP)

(72) Inventors: Tatsuya Ohashi, Kakegawa (JP); Shingo Sakagami, Kakegawa (JP); Tsuyoshi Ito, Kakegawa (JP); Ryota Onoe, Kakegawa (JP); Naoto Miyoshi, Toyota (JP); Masahiko Takeuchi, Toyota (JP); Akemi Sato, Toyota (JP)

(73) Assignee: CATALER CORPORATION, Kakegawa (JP)

( * ) Notice: Subject to any disclaimer, the term of this patent is extended or adjusted under 35 U.S.C. 154(b) by 0 days.

(21) Appl. No.: 15/518,086

(22) PCT Filed: Oct. 6, 2015

(86) PCT No.: PCT/JP2015/078408
§ 371 (c)(1),
(2) Date: Apr. 10, 2017

(87) PCT Pub. No.: WO2016/060029
PCT Pub. Date: Apr. 21, 2016

(65) Prior Publication Data
US 2018/0001308 A1    Jan. 4, 2018

(30) Foreign Application Priority Data
Oct. 17, 2014 (JP) .................. 2014-213110

(51) Int. Cl.
*B01J 23/00* (2006.01)
*B01J 23/10* (2006.01)
(Continued)

(52) U.S. Cl.
CPC .............. *B01J 23/63* (2013.01); *B01D 53/94* (2013.01); *B01D 53/945* (2013.01);
(Continued)

(58) Field of Classification Search
CPC .... B01J 23/63; B01J 35/0006; B01J 35/1076; B01J 35/04; B01J 37/0244; F01N 3/0864;
(Continued)

(56) References Cited

U.S. PATENT DOCUMENTS

2008/0070776 A1* 3/2008 Yamaguchi ........ B01D 46/2429
502/100
2009/0087365 A1 4/2009 Klingmann et al.
2014/0329669 A1 11/2014 Fujimura et al.

FOREIGN PATENT DOCUMENTS

JP        2002-295247 A    10/2002
JP        2007-185571 A     7/2007
(Continued)

OTHER PUBLICATIONS

Nov. 17, 2015 International Search Report issued in International Patent Application No. PCT/JP2015/078408.

*Primary Examiner* — Haytham Soliman
(74) *Attorney, Agent, or Firm* — Oliff PLC

(57) ABSTRACT

A exhaust gas purification apparatus is provided with; a substrate having a wall-flow structure and including entry-side cells, exit-side cells, and a porous partition; a first catalyst region formed in small diameter pores having relatively small pore diameters among internal pores in the partition; and a second catalyst region formed in large diameter pores having relatively large pore diameters among the internal pores in the partition. The first catalyst region contains a support and any one or two species of precious metal selected from Pt, Pd, and Rh loaded on the support, while the second catalyst region contains a support and any one or two species of precious metal selected from Pt, Pd, and Rh loaded on the support and other than at least the precious metal present in the first catalyst region.

6 Claims, 4 Drawing Sheets

(51) Int. Cl.
- *B01J 23/63* (2006.01)
- *B01D 53/94* (2006.01)
- *B01J 35/04* (2006.01)
- *F01N 3/10* (2006.01)
- *F01N 3/28* (2006.01)
- *F01N 3/02* (2006.01)
- *F01N 3/022* (2006.01)
- *F01N 3/023* (2006.01)
- *F01N 3/035* (2006.01)
- *B01J 35/00* (2006.01)
- *B01J 35/10* (2006.01)
- *B01J 37/02* (2006.01)
- *F01N 3/08* (2006.01)

(52) U.S. Cl.
CPC ...... *B01D 53/9454* (2013.01); *B01J 35/0006* (2013.01); *B01J 35/04* (2013.01); *B01J 35/1076* (2013.01); *B01J 37/0244* (2013.01); *F01N 3/02* (2013.01); *F01N 3/022* (2013.01); *F01N 3/023* (2013.01); *F01N 3/035* (2013.01); *F01N 3/0842* (2013.01); *F01N 3/0864* (2013.01); *F01N 3/10* (2013.01); *F01N 3/28* (2013.01); *F01N 3/2878* (2013.01); *B01D 2255/1021* (2013.01); *B01D 2255/1025* (2013.01); *B01D 2255/908* (2013.01); *B01D 2255/9032* (2013.01); *B01D 2255/91* (2013.01); *B01D 2255/9155* (2013.01); *B01D 2255/9202* (2013.01)

(58) Field of Classification Search
CPC ...... F01N 3/2878; F01N 3/035; F01N 3/0842; B01D 53/9454; B01D 53/945; B01D 2255/9155; B01D 2255/908; B01D 2255/91; B01D 2255/1021; B01D 2255/1025; B01D 2255/9202; B01D 2255/9032

See application file for complete search history.

(56) References Cited

FOREIGN PATENT DOCUMENTS

| | | |
|---|---|---|
| JP | 2009-082915 A | 4/2009 |
| JP | 2013-091064 A | 5/2013 |
| JP | 2013-529134 A | 7/2013 |
| JP | 2014-094360 A | 5/2014 |
| JP | 2015-100788 A | 6/2015 |
| WO | 2013/111457 A1 | 8/2013 |
| WO | 2013/121520 A1 | 8/2013 |

* cited by examiner

EXHAUST GAS PURIFICATION APPARATUS

TECHNICAL FIELD

The present invention relates to an exhaust gas purification apparatus. More particularly, the present invention relates to an exhaust gas purification apparatus that purifies an exhaust gas discharged from an internal combustion engine, e.g., a gasoline engine.

This international application claims priority based on Japanese Patent Application No. 2014-213110 filed Oct. 17, 2014, and the contents of said application are incorporated in their entirety in this Description by reference.

BACKGROUND ART

It is known that particulate matter (PM), which has carbon as its main component, and ash, which is made of uncombusted components, are generally present in the exhaust gas discharged from an internal combustion engine and are a cause of atmospheric pollution. Due to this, regulations on the amount of particulate matter emissions—along with those on the components present in exhaust gas, e.g., hydrocarbon (HC), carbon monoxide (CO), and nitrogen oxides (NOx)—are becoming more severe year by year. Technology for the collection and removal of this particulate matter from exhaust gas has thus been proposed.

For example, a particulate filter may be disposed in the exhaust passage of an internal combustion engine in order to collect the particulate matter. For example, while being less than that for diesel engines, gasoline engines do discharge a certain amount of particulate matter in their exhaust gas and as a consequence a gasoline particulate filter (GPF) is in some cases installed in their exhaust passage. Particulate filters having what is known as a wall-flow structure are known here; this structure has a substrate constituted of a large number of porous cells wherein the entrances and exits of the large number of cells are plugged in alternation (Patent Literature 1, Patent Literature 2). In a wall-flow particulate filter, the exhaust gas that has flowed in through a cell entrance passes through the interposed porous cell partition and is discharged to and through a cell exit. While the exhaust gas is passing through the porous cell partition, the particulate matter is collected within the pores in the interior of the partition.

CITATION LIST

Patent Literature

Patent Literature 1: Japanese Patent Application Laid-open No. 2009-82915
Patent Literature 2: Japanese Patent Application Laid-open No. 2007-185571

SUMMARY OF INVENTION

The loading of a precious metal catalyst onto such a particulate filter has been under investigation in recent years in order to further improve the purification performance. For example, Patent Literature 1 describes a filter catalyst in which, for the precious metal catalyst, a layer of palladium (Pd) is disposed in the interior of the partition and a layer of rhodium (Rh) is layered on the surface of the partition. Patent Literature 2 describes a filter catalyst in which, for the precious metal catalyst, a layer of platinum (Pt) and a layer of rhodium (Rh) are separately supported within the partition.

However, with the filter catalyst according to Patent Literature 1, the flow path resistance for the exhaust gas is raised due to the formation of the Rh layer on the surface of the partition and large pressure losses then occur. The risk occurs of a reduction in the engine output as a result. With the filter catalyst of Patent Literature 2, the increase in the pressure loss can be suppressed because the Pt layer and Rh layer are separately supported within the partition; however, because the Rh layer and Pt layer are separated in layer form along the direction of exhaust gas flow, the exhaust gas passes through the Rh layer and Pt layer only once and there is then a limit on the improvement in the purification performance. There is thus still room for improvement with these conventional filter catalysts with regard to bringing about a balanced co-existence between the improvement in purification performance and the reduction in pressure loss.

The present invention was achieved considering these circumstances, and the main object of the present invention is to provide an exhaust gas purification apparatus having a wall-flow structure-type filter catalyst wherein the exhaust gas purification apparatus can provide an improved exhaust gas purification performance while exhibiting reduced pressure losses.

Solution to Problem

The exhaust gas purification apparatus according to the present invention is disposed in an exhaust passage of an internal combustion engine and purifies an exhaust gas discharged from the internal combustion engine. This apparatus is provided with: a substrate having a wall-flow structure and including an entry-side cell in which only an exhaust gas inflow-side end part is open, an exit-side cell residing adjacent to an entry-side cell and in which only an exhaust gas outflow-side end part is open, and a porous partition that divides the entry-side cell from the exit-side cell; a first catalyst region formed in small pores having relatively small pore diameters among internal pores in the partition; and a second catalyst region formed in large pores having relatively large pore diameters among the internal pores in the partition. The first catalyst region contains a support and any one or two species of precious metal selected from platinum (Pt), palladium (Pd), and rhodium (Rh) loaded on the support. The second catalyst region contains a support and any one or two species of precious metal selected from Pt, Pd, and Rh loaded on the support and other than at least the precious metal present in the first catalyst region.

Sintering (alloying) between the plurality of precious metal species is effectively suppressed with this exhaust gas purification apparatus because the plurality of precious metal species are supported separately in the small pores (first catalyst region) and large pores (second catalyst region) of the partition. Due to this, catalyst deterioration is inhibited even when exposure to high temperatures occurs. In addition, because both the first catalyst region and the second catalyst region are disposed in the interior of the partition, the increase in flow path resistance that occurs when a catalyst region is formed on the surface of the partition is avoided and the pressure loss can then be reduced. Moreover, the exhaust gas is efficiently contacted with the precious metal in a plurality of reaction fields because a plurality of precious metal species are present within the partition in a randomly dispersed state along the flow direction of the exhaust gas. A higher purification performance can be achieved as a result. The present invention can thus provide an exhaust gas purification apparatus that has a markedly improved exhaust gas purification performance while supporting a reduction in pressure losses.

In a preferred aspect of the herein disclosed exhaust gas purification apparatus, the average pore diameter of the small pores in which the first catalyst region is formed is not more than 10 µm and the average pore diameter of the large pores in which the second catalyst region is formed is greater than 10 µm and not more than 100 µm. The exhaust gas passing through the interior of the partition can be more efficiently purified by having the plurality of precious metal species be separately supported in small pores and large pores having the indicated pore diameters.

In a preferred aspect of the herein disclosed exhaust gas purification apparatus, the first catalyst region contains Pt as the precious metal and the second catalyst region contains Rh as the precious metal. This construction makes it possible to efficiently purify the harmful components in the exhaust gas all at once and thereby brings about an additional improvement in the exhaust gas purification performance.

In a preferred aspect of the herein disclosed exhaust gas purification catalyst, the Pt content in the first catalyst region is 0.3 g to 1 g per 1 L of substrate volume and the Rh content in the second catalyst region is 0.1 g to 0.5 g per 1 L of substrate volume. The ratio between the Pt disposed in the small pores and the Rh disposed in the large pores is brought into a favorable balance with this configuration, and because of this an even more efficient purification of the harmful components in the exhaust gas can be achieved.

In a preferred aspect of the herein disclosed exhaust gas purification apparatus, the first catalyst region contains an NOx absorber that has an NOx storage capacity (for example, a barium compound). The incorporation of an NOx absorber in such a first catalyst region makes it possible to achieve an efficient purification of the NOx present in the exhaust gas. Because, in this case, the NOx absorber is disposed within the partition in a randomly dispersed state along the exhaust gas flow direction, the NOx in the exhaust gas passing through the interior of the partition can be favorably absorbed and released. A higher purification performance can be achieved as a consequence.

In a preferred aspect of the herein disclosed exhaust gas purification apparatus, the second catalyst region contains an OSC material that has an oxygen storage capacity (for example, $CeO_2$ or $CeO_2$—$ZrO_2$ composite oxide). Through the incorporation of an OSC material in such a second catalyst region, a stable catalytic performance is obtained and the purification performance of the catalyst is improved. Because, in this case, the OSC material is disposed within the partition in a randomly dispersed state along the exhaust gas flow direction, the oxygen in the exhaust gas passing through the interior of the partition can be favorably absorbed and released. The purification performance of the catalyst is increased further as a consequence.

In a preferred embodiment of the herein disclosed exhaust gas purification apparatus, the internal combustion engine is a gasoline engine. The exhaust gas temperature is relatively high and PM deposition within the partition is impeded in gasoline engines. As a consequence, the effects indicated above are more effectively exhibited when the internal combustion engine is a gasoline engine.

DESCRIPTION OF EMBODIMENTS

Preferred embodiments of the present invention are described in the following based on the drawings. Matters required for the execution of the present invention but not particularly described in this Description (for example, general matters such as in relation to the disposition of a particulate filter in an automobile) can be understood as design matters for the individual skilled in the art based on the conventional art in the pertinent field. The present invention can be executed based on the contents disclosed in this Description and the common general technical knowledge in the pertinent field.

Figure 1:
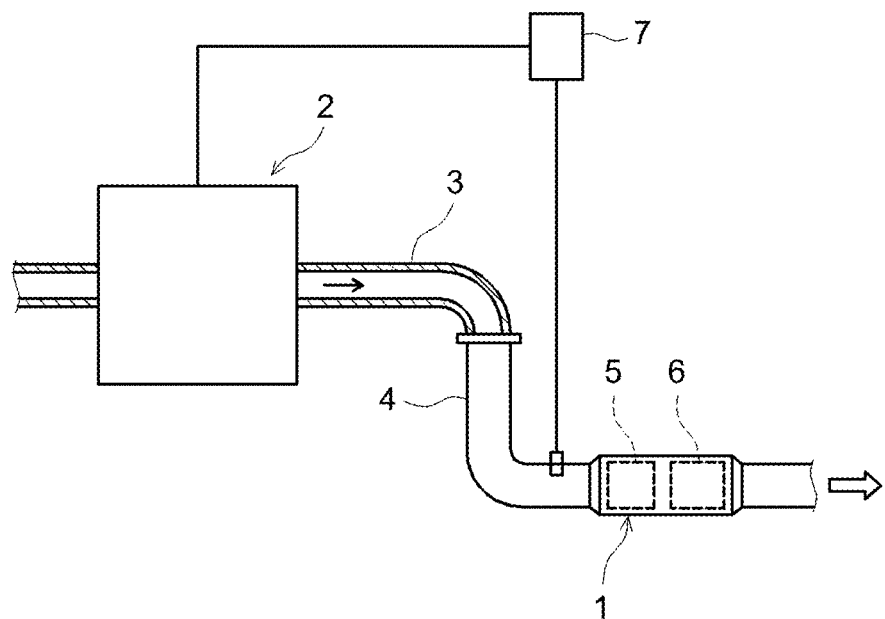
FIG. 1 is a diagram that schematically illustrates an exhaust gas purification apparatus according to an embodiment of the present invention.

The structure of an exhaust gas purification apparatus according to an embodiment of the present invention is described first with reference to FIG. 1. The herein disclosed exhaust gas purification apparatus 1 is disposed in the exhaust system of an internal combustion engine. FIG. 1 is a diagram that schematically illustrates an internal combustion engine 2 and the exhaust gas purification apparatus 1 disposed in the exhaust system of this internal combustion engine 2.

A mixed gas containing oxygen and fuel gas is supplied to the internal combustion engine (engine) according to this embodiment. The internal combustion engine causes this fuel gas to undergo combustion and converts the combustion energy to mechanical energy. During this process, the combusted mixed gas is converted into an exhaust gas and is discharged into the exhaust system. The internal combustion engine 2 in the configuration shown in FIG. 1 is constructed of an automobile gasoline engine as its main unit.

The exhaust system in this engine 2 will now be described. An exhaust manifold 3 is connected to an exhaust port (not shown) that connects the engine 2 to the exhaust system. The exhaust manifold 3 is connected to an exhaust pipe 4 through which the exhaust gas flows. The exhaust passage in this embodiment is formed by the exhaust manifold 3 and the exhaust pipe 4. The arrow in the figure shows the direction of exhaust gas through flow.

The herein disclosed exhaust gas purification apparatus 1 is disposed in the exhaust system of the engine 2. This exhaust gas purification apparatus 1 is provided with a catalyst section 5, a filter section 6, and an ECU 7 and collects the particulate matter (PM) present in the exhaust gas while also purifying the harmful components (for example, carbon monoxide (CO), hydrocarbon (HC), and nitrogen oxides (NOx)) that are present in the discharged exhaust gas.

The catalyst section 5 is constructed to be capable of purifying the three-way components (NOx, HC, CO) present in the exhaust gas and is disposed in the exhaust pipe 4 that communicates with the engine 2. As specifically shown in FIG. 1, it is disposed on the downstream side of the exhaust pipe 4. The type of catalyst section 5 is not particularly limited. The catalyst section 5 may be, for example, a catalyst in which precious metal, e.g., platinum (Pt), palladium (Pd), rhodium (Rh), and so forth, is loaded. A downstream catalyst section may also be disposed in the exhaust pipe 4 on the downstream side of the filter section 6. The specific structure of this catalyst section 5 is not a characteristic feature of the present invention and a detailed description thereof is thus omitted here.

The filter section 6 is disposed on the downstream side of the catalyst section 5. The filter section 6 is provided with a gasoline particulate filter (GPF) capable of collecting and removing the particulate matter (referred to hereafter simply as "PM") present in the exhaust gas. The particulate filter according to this embodiment is described in detail in the following.

Figure 2:
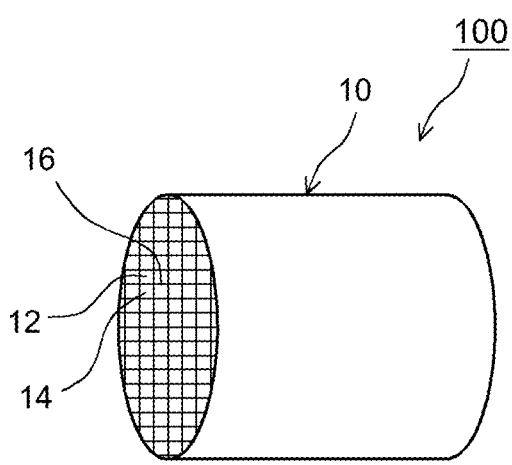
FIG. 2 is a perspective diagram that schematically illustrates the filter in an exhaust gas purification apparatus according to an embodiment of the present invention.
Figure 3:
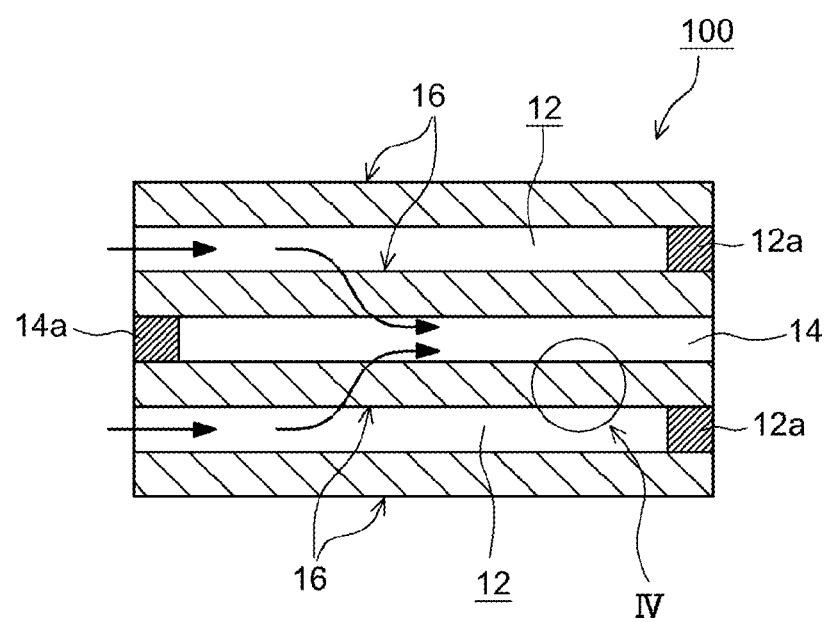
FIG. 3 is a cross-sectional diagram that schematically illustrates the filter cross section of an exhaust gas purification apparatus according to an embodiment of the present invention.

FIG. 2 is a perspective diagram of a particulate filter 100. FIG. 3 is a schematic diagram provided by enlarging a portion of a cross section of the particulate filter 100 taken in the axial direction. As shown in FIGS. 2 and 3, the particulate filter 100 is provided with a substrate 10 having a wall-flow structure, a first catalyst region 20 (refer to FIG. 4), and a second catalyst region 30 (refer to FIG. 4). The substrate 10, the first catalyst region 20, and the second catalyst region 30 are successively described in the following.

<Substrate 10>

The various materials and shapes heretofore used in this type of application may be used for the substrate 10. For example, a substrate formed from a ceramic, e.g., cordierite, silicon carbide (SiC), and so forth, or an alloy (e.g., stainless steel) can be advantageously used. A substrate having a cylindrical outer shape (this embodiment) is one example.

However, in addition to a cylindrical shape, for example, an elliptical cylindrical shape or a polygonal cylindrical shape may be used for the outer shape of the substrate as a whole. This substrate 10 has an entry-side cell 12 in which only the exhaust gas inflow-side end part is open, an exit-side cell 14 residing adjacent to an entry-side cell 12 and in which only the exhaust gas outflow-side end part is open, and a porous partition 16 that divides the entry-side cell 12 from the exit-side cell 14.

<Entry-side Cell 12 and Exit-side Cell 14>

With the entry-side cell 12, only the exhaust gas inflow-side end part is open; an exit-side cell 14 resides adjacent to an entry-side cell 12 and is open only at the exhaust gas outflow-side end part. In this embodiment, the exhaust gas outflow-side end part of the entry-side cell 12 is plugged by a sealed part 12a, and the exhaust gas inflow-side end part of the exit-side cell 14 is plugged by a sealed part 14a. A suitable shape and size may be established for the entry-side cell 12 and the exit-side cell 14 considering the components and flow rate of the exhaust gas that is supplied to the filter 100. For example, the shape of the entry-side cell 12 and the exit-side cell 14 may be various geometric shapes, e.g., quadrilateral shapes such as square, parallelogram, rectangle, or trapezoid; a triangle; another polygon (for example, a hexagon or octagon); or a circle.

<Partition 16>

A partition 16 is formed between an adjacent entry-side cell 12 and exit-side cell 14. The entry-side cell 12 and the exit-side cell 14 are divided from each other by this partition 16. The partition 16 has a porous structure through which the exhaust gas can pass. There are no particular limitations on the porosity of the partition 16, but approximately 50% to 70% is suitable while 55% to 65% is preferred. The pressure loss ends up increasing when the porosity of the partition 16 is too small, while the mechanical strength of the filter 100 assumes a declining trend when the porosity of the partition 16 is too large, and either is thus disadvantageous. The thickness of the partition 16 is not particularly limited, but is favorably from about 200 µm to 800 µm. When the thickness of the partition is in this range, a suppressing effect on pressure loss increases is obtained without impairing the PM collection efficiency.

Figure 4:
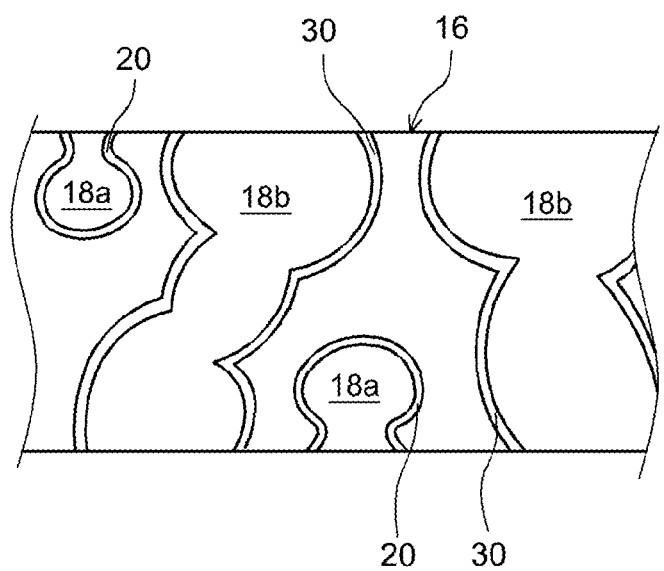
FIG. 4 is a schematic cross-sectional diagram that is an enlargement of the IV region in FIG. 3.

FIG. 4 is an enlarged schematic diagram provided by enlarging the IV region in FIG. 3. As shown in FIG. 4, the partition 16 has a small pore 18a that has a relatively small pore diameter and a large pore 18b that has a relatively large pore diameter. In this embodiment, the partition 16 is constructed such that the front side of the partition 16 can communicate with the rear side through an independent large pore 18b (or a chain of many large pores 18b and/or small pores 18a). In addition, a complex tortuous path (nontraversing detour path) is formed in the partition 16 by small pores 18a that do not communicate across the partition 16 in the thickness direction. A first catalyst region 20 is formed in the interior of the small pore 18a. A second catalyst region 30 is formed in the interior of the large pore 18b.

<First Catalyst Region>

Among the internal pores 18a and 18b within the partition 16, the first catalyst region 20 is formed at the wall surface of the small pores 18a. The exhaust gas tends to have a longer residence because a complex tortuous path (nontraversing detour path) is formed in the partition 16 by the small pores 18a. Due to this, the exhaust gas can be efficiently purified through the formation of the first catalyst region 20 in the small pore 18a. The pore diameter of the small pores 18a in which the first catalyst region 20 is formed should be smaller than the pore diameter of the large pores 18b in which the second catalyst region 30 is formed. For example, the average pore diameter of the small pore 18a in which the first catalyst region 20 is formed, based on mercury intrusion or image observation with an electron microscope (scanning electron microscope or SEM), is preferably not more than approximately 10 µm (for example, at least 0.1 µm and not more than 10 µm) and is more preferably not more than 8 µm and particularly preferably not more than 5 µm. By having the pore diameter of the small pore 18a be in this range, the exhaust gas can be efficiently purified by the first catalyst region 20 formed in the small pore 18a. The harmful components purified by the first catalyst region 20 are not particularly limited, but can be exemplified by HC, CO, and NOx. The first catalyst region 20 is provided with a support (not shown) and with precious metal (not shown) loaded on this support.

The first catalyst region 20 should contain any one species or two species of precious metal from platinum (Pt), palladium (Pd), and rhodium (Rh). The first catalyst region 20 contains Pt as the precious metal in this embodiment. The Pt content in the first catalyst region 20 per 1 L of substrate volume is preferably approximately 0.1 g to 2 g (preferably 0.5 g to 1 g). When the loaded amount of Pt is too low, the catalytic activity provided by the Pt is inadequate; when, on the other hand, the loaded amount of Pt is too large, this facilitates the occurrence of particle growth by the Pt while at the same time being disadvantageous from a cost standpoint. The first catalyst region 20 may contain a precious metal other than Rh, Pt, or Pd. For example, ruthenium (Ru), iridium (Ir), osmium (Os) and so forth can be used as the precious metal other than Rh, Pt, or Pd.

The first catalyst region 20 is formed by loading the Pt on the support. This support (typically a particulate) can be exemplified by metal oxides such as alumina ($Al_2O_3$), zirconia ($ZrO_2$), ceria ($CeO_2$), silica ($SiO_2$), magnesia (MgO), and titanium oxide (titania: $TiO_2$) and by their solid solutions (for example, ceria-zirconia ($CeO_2$—$ZrO_2$) composite oxide). Among these, the use of ceria-zirconia composite oxide is preferred. Two or more of the preceding may also be used in combination. Other substances (typically an inorganic oxide) may be added to the support as a secondary component. The following, for example, can be used as substances that can be added to the support: rare-earth elements, e.g., lanthanum (La), yttrium (Y), and so forth; alkaline-earth elements, e.g., calcium and so forth; and transition metal elements. Among these, rare-earth elements such as lanthanum and yttrium are advantageously used as stabilizers because they can improve the specific surface area at high temperatures without poisoning the catalytic function.

There are no particular limitations on the method for loading the Pt on the support. For example, preparation can be carried out by impregnating the support with an aqueous solution containing a Pt salt (for example, the nitrate) or a Pt complex (for example, the dinitrodiamine complex), followed by drying and baking.

In addition to the Pt-loaded support, a metal oxide not loaded with a precious metal can be added to the herein disclosed first catalyst region 20. Stabilized alumina is an example of this metal oxide. The stabilized alumina content, using 100 mass % for the total of Pt, support and stabilized alumina, generally is suitably 20 mass % to 50 mass %, for example, preferably 30 mass % to 40 mass %.

The herein disclosed first catalyst region 20 may contain an NOx absorber that has an NOx storage capacity. The NOx absorber should have an NOx storage capacity whereby it absorbs NOx in the exhaust gas under conditions in which the air-fuel ratio of the exhaust gas is in a lean condition of oxygen excess and it releases the absorbed NOx when the air-fuel ratio switches to the rich side. A basic material containing one or two or more metals capable of donating electrons to NOx is preferably used for this NOx absorber. The metal can be exemplified by alkali metals such as potassium (K), sodium (Na), and cesium (Cs); alkaline-earth metals such as barium (Ba) and calcium (Ca); rare earths such as the lanthanoids; and silver (Ag), copper (Cu), iron (Fe), iridium (Ir), and so forth. Among these, barium compounds (for example, barium sulfate) have a high NOx storage capacity and are thus advantageous as the NOx absorber used in the herein disclosed exhaust gas purification apparatus. The content of the NOx absorber, with reference to the total mass of the first catalyst region 20, is preferably a content that satisfies 10 mass % to 25 mass % and is particularly preferably a content that satisfies 12 mass % to 20 mass %. In accordance with the present construction, the NOx absorber is disposed within the partition 16 in a randomly dispersed state along the flow direction of the exhaust gas, and because of this the NOx in the exhaust gas passing through the interior of the partition 16 can be favorably absorbed and released. An even higher purification performance can be achieved as a consequence.

<Second Catalyst Region 30>

Among the internal pores 18a and 18b in the partition 16, the second catalyst region 30 is formed on the wall surface of the large pores 18b. Since the large pores 18b communicate across the partition 16 in the thickness direction, this sets up a tendency for the exhaust gas to smoothly pass through. As a consequence, through the formation of the second catalyst region 30 in the large pores 18b, the exhaust gas can be purified while pressure loss increases are restrained. The pore diameter of the large pores 18b in which the second catalyst region 30 is formed should be larger than the pore diameter of the small pores 18a in which the first catalyst region 20 is formed. For example, the average pore diameter of the large pores 18b in which the second catalyst region 30 is formed, based on mercury intrusion or image observation with an electron microscope (SEM), preferably exceeds about 10 μm (for example, more than 10 μm and not more than 100 μm), more preferably is at least 15 μm, and particularly preferably is at least 20 μm. When the pore diameter of the large pore 18b is in this range, the exhaust gas can be purified by the second catalyst region 30 formed in the large pore 18b while restraining pressure loss increases. The harmful components to be purified by the second catalyst region 30 are not particularly limited, but can be exemplified by HC, CO, and NOx. The second catalyst region 30 is provided with a support (not shown) and with precious metal (not shown) loaded on this support.

The second catalyst region 30 should contain any one or two species of precious metal selected from among Pt, Pd, and Rh, which, however, is not or are not the precious metal (Pt here) contained in the first catalyst region 20. In this embodiment, the second catalyst region 30 contains Rh as the precious metal. The Rh content in the second catalyst region 30 per 1 L of substrate volume is preferably about 0.1 g to 0.5 g. When this Rh content is too low, the catalytic activity provided by the Rh is then inadequate; when, on the other hand, the Rh content is too large, Rh particle growth then easily occurs and at the same time this is also disadvantageous from a cost standpoint. The second catalyst region 30 may contain a precious metal other than Rh, Pt, or Pd. For example, ruthenium (Ru), iridium (Ir), osmium (Os) and so forth can be used as the precious metal other than Rh, Pt, or Pd.

The second catalyst region 30 is formed by loading the Rh on the support. This support (typically a particulate) can be exemplified by metal oxides such as alumina ($Al_2O_3$), zirconia ($ZrO_2$), ceria ($CeO_2$), silica ($SiO_2$), magnesia (MgO), and titanium oxide (titania: $TiO_2$) and by their solid solutions (for example, ceria-zirconia ($CeO_2$—$ZrO_2$) composite oxide). Among these, the use of alumina is preferred. Two or more of the preceding may also be used in combination. Other substances (typically an inorganic oxide) may be added to the support as a secondary component. The following, for example, can be used as substances that can be added to the support: rare-earth elements, e.g., lanthanum (La), yttrium (Y), and so forth; alkaline-earth elements, e.g., calcium and so forth; and transition metal elements. Among these, rare-earth elements such as lanthanum and yttrium are advantageously used as stabilizers because they can improve the specific surface area at high temperatures without poisoning the catalytic function.

There are no particular limitations on the method for loading the Rh on the support. For example, preparation can be carried out by impregnating the support with an aqueous solution containing an Rh salt (for example, the nitrate) or an Rh complex (for example, the tetraammine complex), followed by drying and baking.

The herein disclosed second catalyst region 30 may contain an oxygen storage capacity (OSC) material that has an oxygen storage capacity. The OSC material should store the oxygen in the exhaust gas when the air-fuel ratio of the exhaust gas is lean (i.e., atmosphere on the oxygen excess side) and release the stored oxygen when the air-fuel ratio in the exhaust gas is rich (i.e., atmosphere on the fuel excess side). This OSC material can be exemplified by cerium oxide (ceria: $CeO_2$) and ceria-containing composite oxides (for example, ceria-zirconia composite oxide ($CeO_2$—$ZrO_2$ composite oxide)). Among the preceding, $CeO_2$—$ZrO_2$ composite oxide has a high oxygen storage capacity and is thus advantageous as the OSC material for use in the herein disclosed exhaust gas purification apparatus. The content of this OSC material, with reference to the total mass of the second catalyst region 30, is preferably a content that satisfies 25 mass % to 50 mass % and is particularly preferably a content that satisfies 30 mass % to 40 mass %. In accordance with the present construction, the OSC material is disposed within the partition 16 in a randomly dispersed state along the flow direction of the exhaust gas, and because of this the oxygen in the exhaust gas passing through the interior of the partition 16 can be favorably absorbed and released. As a consequence, a more stable catalytic performance is obtained and the purification performance by the catalyst is further improved.

<Method of Forming the First Catalyst Region 20 and the Second Catalyst Region 30>

The formation of the first catalyst region 20 and the second catalyst region 30 may be carried out based on different slurries for the first catalyst region 20 and the second catalyst region 30. For example, a first slurry for forming the first catalyst region 20 and a second slurry for forming the second catalyst region 30 may be prepared.

The first slurry contains a suitable medium (for example, deionized water), an NOx absorber, stabilized alumina, and a powder provided by loading Pt on the aforementioned support. The viscosity, solids concentration, particle diameter of the particles present in the first slurry (typically a powder of the precious metal-loaded support), and so forth of the first slurry are adjusted as appropriate so as to facilitate flow into the small pore 18a of the partition 16. A binder is preferably incorporated in the first slurry in order to bring about a suitable adherence of the first slurry to the interior of the partition 16. The use of, for example, an alumina sol, silica sol, and so forth for the binder is preferred. The second slurry contains a suitable medium (for example, deionized water), an OSC material, and a powder provided by supporting Rh on the aforementioned support. The viscosity, solids concentration, particle diameter of the particles present in the second slurry (typically a powder of the precious metal-loaded support), and so forth of the second slurry are adjusted as appropriate so as to facilitate flow into the large pore 18b of the partition 16. A binder may be incorporated in the second slurry in order to bring about a suitable adherence of the second slurry to the interior of the partition 16. The use of, for example, an alumina sol, silica sol, and so forth for the binder is preferred.

The interior of the partition 16 is first coated with the first slurry when the first catalyst region 20 and the second catalyst region 30 are to be formed. There are no particular limitations on the method for coating the interior of the partition 16 with the first slurry. For example, the partition 16 may be immersed for a prescribed period of time in the first slurry and may then be withdrawn. After the partition 16 has been withdrawn from the first slurry, the excess first slurry may be eliminated by blowing with compressed gas (or by suction). Here, the first slurry readily flows under the effects of capillary phenomena into the small pore 18a having a relatively small pore diameter. Due to this, the first slurry preferentially flows into the small pore 18a of the partition 16 when the partition 16 is immersed in the first slurry. In addition, outflow of the first slurry from the small pore 18a having a relatively small pore diameter is impeded by capillary phenomena. As a consequence, the first slurry filled in the large pore 18b is preferentially eliminated when blowing with compressed gas (or suction) is performed after the partition 16 has been removed from the first slurry. Thus, with this method, the small pore 18a is readily filled by the first slurry and the filling of the large pore 18b with the first slurry is impeded. The first slurry can be preferentially filled into the small pore 18a as a result. Once the small pore 18a has been filled by the first slurry, drying and baking may then be carried out. The first catalyst region 20 is thereby formed on the wall surface of the small pore 18a.

The interior of the partition 16 is then suction coated with the second slurry. There are no particular limitations on the method for coating the interior of the partition 16 with the second slurry. For example, the partition 16 may be immersed in the second slurry for a prescribed period of time followed by removal. The viscosity and solids concentration of the second slurry are adjusted as appropriate such that the second slurry easily flows into the large pore 18b of the partition 16. In addition, the small pore 18a is already coated with the first catalyst region 20. As a consequence, when the partition 16 is immersed in the second slurry, the second slurry preferentially flows into the large pore 18b of the partition 16. Once the second slurry has been filled into the large pore 18b proceeding in this manner, drying and baking may then be carried out. The second catalyst region 30 is thereby formed on the wall surface of the large pore 18b.

In accordance with the herein disclosed art, a method can thus be provided for producing a particulate filter that has a substrate having a wall-flow structure and including an entry-side cell in which only an exhaust gas inflow-side end part is open, an exit-side cell residing adjacent to an entry-side cell and in which only an exhaust gas outflow-side end part is open, and a porous partition that divides the entry-side cell from the exit-side cell;

a first catalyst region formed in small pores having relatively small pore diameters among internal pores in the partition; and a second catalyst region formed in large pores having relatively large pore diameters among the internal pores in the partition, wherein the first catalyst region contains a support and any one or two species of precious metal selected from Pt, Pd, and Rh loaded on the support, and the second catalyst region contains a support and any one or two species of precious metal selected from Pt, Pd, and Rh loaded on the support and other than at least the precious metal present in the first catalyst region.

This production method comprises:

forming a first catalyst region by applying, to the small pores having relatively small pore diameters among the internal pores in the partition, a first slurry containing a support loaded with any one or two species of precious metal selected from Pt, Pd, and Rh (the first catalyst region formation step); and forming a second catalyst region by applying, to the large pores having relatively large pore diameters among the internal pores in the partition, a second slurry containing a support loaded with at least precious metal that is other than the precious metal present in the first catalyst region and is any one or two species of precious metal selected from Pt, Pd, and Rh (the second catalyst region formation step).

With regard to the first slurry here, the viscosity and solids concentration of the first slurry and the average particle diameter of the particles in the first slurry can be established as appropriate so as to enable the first slurry to flow into the small pores. With regard to the second slurry, the viscosity and solids concentration of the second slurry and the average particle diameter of the particles present in the second slurry can be established as appropriate so as to enable the second slurry to flow into the large pores.

In a preferred embodiment, the first catalyst region formation step comprises immersing the partition in the first slurry (immersion step) and removing the partition from the first slurry and thereafter eliminating the excess first slurry by blowing with a compressed gas (slurry removal step). Here, the conditions in the slurry removal step during blowing with compressed gas (for example, the pressure of the gas and the impingement time) are established so that the first slurry preferentially fills the small pores (the first slurry is preferentially removed from the large pores), and the slurry removal step can then be carried out by blowing with the gas in accordance with the conditions thereby established. The particulate filter produced by this method can be advantageously used as the filter section in an exhaust gas purification apparatus.

As shown in FIG. 3, exhaust gas flows into this particulate filter 100 through the entry-side cell 12 in the substrate 10. The exhaust gas that has flowed in through the entry-side cell 12 passes through the porous partition 16 and thereby reaches the exit-side cell 14. The arrows in FIG. 3 show the route by which the exhaust gas that has flowed in through the entry-side cell 12 passes through the partition 16 and reaches the exit-side cell 14. During this sequence, because the partition 16 has a porous structure, the particulate matter (PM) is collected at the surface of the partition 16 and within the pores in the interior of the partition 16 while the exhaust gas is passing through the partition 16. In addition, because the first catalyst region 20 and the second catalyst region 30 are disposed in the interior of the partition 16, the harmful components in the exhaust gas are purified while the exhaust gas is passing through the interior of the partition 16. The exhaust gas that has passed through the partition 16 and has reached the exit-side cell 14 is discharged through the opening on the exhaust gas outflow side to the outside of the filter 100.

With this particulate filter 100, sintering (alloying) of the Pt and Rh is effectively suppressed because the Pt and Rh are separately supported in the small pores 18a and large pores 18b of the internal pores in the partition 16. Catalyst deterioration is suppressed as a consequence even when exposure to high temperatures occurs. In addition, because both the first catalyst region 20 and the second catalyst region 30 are disposed in the interior of the partition 16, the increase in flow path resistance that occurs when a catalyst region is formed on the surface of the partition 16 is avoided and the pressure loss can then be reduced. Moreover, efficient contact between the exhaust gas and the Pt and the exhaust gas and the Rh occurs in a plurality of reaction fields because the Pt and Rh are present within the partition 16 in a randomly dispersed state along the flow direction of the exhaust gas. A higher purification performance can be achieved as a result. The present construction can thus provide an exhaust gas purification apparatus 1 that has a markedly improved exhaust gas purification performance while supporting a reduction in pressure losses.

A test example is described in the following in relation to the present invention, but this should not be taken to mean that the present invention is limited to what is given in the following test example.

EXAMPLE

Ceria-zirconia composite oxide was prepared as the support for the formation of the first catalyst region and was immersed in a solution of dinitrodiamine Pt as the precious metal catalyst solution; this was followed by evaporation to dryness to prepare a Pt/ceria-zirconia composite oxide support powder loaded with 1.91 mass % Pt. 62.2 mass parts of this Pt/ceria-zirconia composite oxide support powder, 36.61 mass parts of La-stabilized alumina, 18.32 mass parts of $BaSO_4$, and 2.44 mass parts of an alumina binder were mixed with deionized water to prepare a first slurry. A wall flow-type cordierite substrate (103 mm diameter, 105 mm total length) was then immersed in this first slurry; the excess slurry was blown off by blowing with compressed gas; and drying and baking were carried out to then form a first catalyst region 20 in the interior of the partition 16. The mass of the first catalyst region per 1 L of substrate volume was 52.85 g and the mass of the Pt per 1 L of substrate volume was 0.5251 g.

La-stabilized alumina was prepared as the support for formation of the second catalyst region and was immersed in an Rh nitrate solution as the precious metal catalyst solution; this was followed by evaporation to dryness to prepare an Rh/alumina support powder loaded with 0.8 mass % Rh. 36.9 mass parts of this Rh/alumina support powder, 36.61 mass parts of ceria-zirconia composite oxide, and 4.88 mass parts of an alumina binder were mixed with deionized water to prepare a second slurry. The aforementioned wall-flow substrate was then immersed in this second slurry; the excess slurry was blown off; and drying and baking were carried out to then form a second catalyst region 30 in the interior of the partition 16. The mass of the second catalyst region per 1 L of substrate volume was 34.65 g and the mass of the Rh per 1 L of substrate volume was 0.1313 g. A filter catalyst having the first catalyst region 20 and the second catalyst region 30 formed in the interior of the partition was thus produced proceeding as described above.

Figure 5:
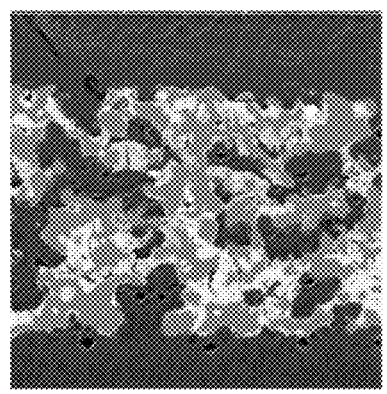
FIG. 5 is a cross-sectional SEM image of a particulate filter according to an example.
Figure 6:
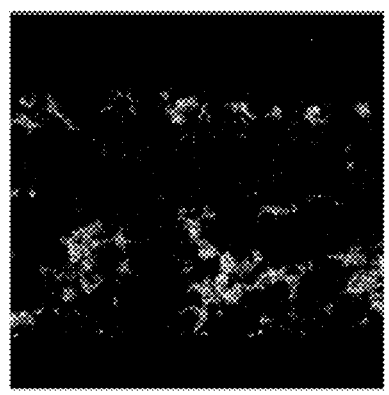
FIG. 6 is an image provided by EPMA observation, that shows the state of dispersion of Pt in a particulate filter according to an example.
Figure 7:
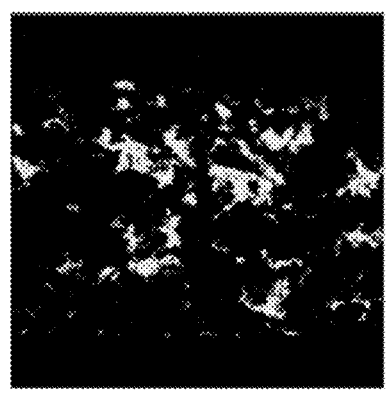
FIG. 7 is an image provided by EPMA observation, that shows the state of dispersion of Rh in a particulate filter according to an example.

An SEM image of the cross section of the obtained filter catalyst is shown in FIG. 5. The state of dispersion by the Pt was also observed by electron probe for microanalysis (EPMA). The results are shown in FIG. 6. The state of dispersion by the Rh was also observed by EPMA. The results are shown in FIG. 7. As shown in FIGS. 5 and 6, by mapping the Pt using EPMA, it was confirmed that the Pt-containing first catalyst region 20 was formed mainly in the small pores 18a of the partition 16. As shown in FIGS. 5 and 7, by mapping the Rh using EPMA, it was confirmed that the Rh-containing second catalyst region 30 was formed mainly in the large pores 18b of the partition 16.

COMPARATIVE EXAMPLE

For comparison, a filter catalyst was prepared in which a mixed catalyst region of Pt and Rh was formed in the interior of the partition. Specifically, 36.9 mass parts of the Rh/alumina support powder, 36.61 mass parts of ceria-zirconia composite oxide, 62.2 mass parts of the Pt/ceria-zirconia composite oxide support powder, 36.61 mass parts of alumina, and 18.32 mass parts of $BaSO_4$ were mixed with deionized water to prepare a slurry for the formation of a mixed catalyst region. A wall flow-type substrate was then immersed in this slurry; the excess slurry was blown off; and drying and baking were then carried out to form a mixed catalyst region in the interior of the partition. The Pt mass and Rh mass per 1 L of substrate volume were the same as in the example.

Figure 8:
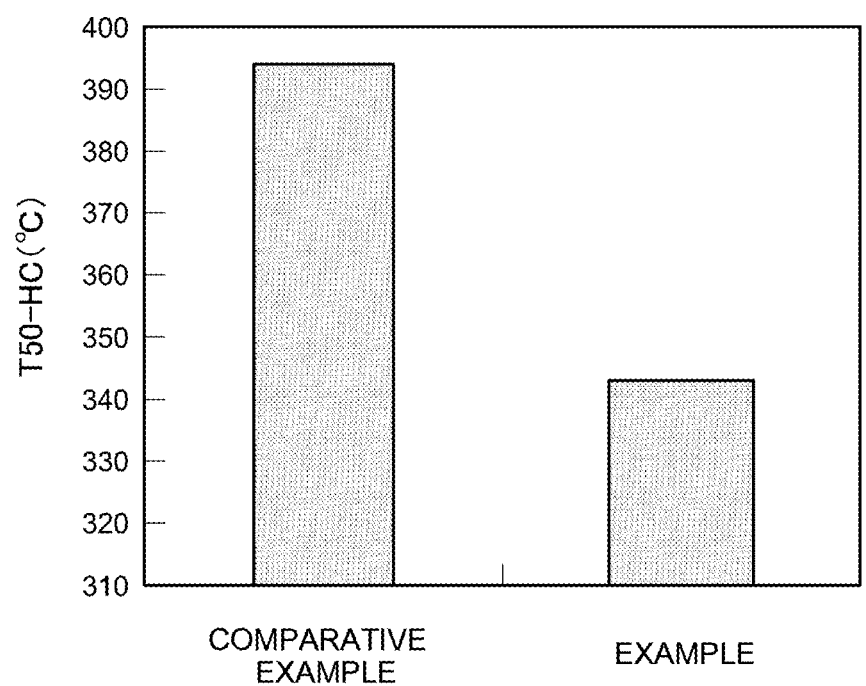
FIG. 8 is a graph that shows the 50% purification temperature for an example and a comparative example.

For both the filter catalyst according to the example and the filter catalyst according the comparative example, the 50% purification temperature was measured by continuously measuring the purification percentage for HC gas during temperature ramp up from 100° C. to 600° C. (ramp rate=20° C./minute). This 50% purification temperature is the gas temperature at the catalyst entrance when the HC gas purification percentage reaches 50%. The results are shown in FIG. 8. FIG. 8 is a graph that shows the 50% purification temperature for the example and comparative example.

As shown in FIG. 8, the 50% purification temperature for HC exceeded 390° C. with the filter catalyst according to the comparative example. In the comparative example, the Pt was not separated from the Rh and it is hypothesized that sintering (alloying) between the Pt and Rh developed and that the catalytic performance declined due to this. In contrast, the filter catalyst according to the example had a lower 50% purification temperature for HC and thus had a better catalytic activity. It is hypothesized that the catalytic performance was improved in the example as a result of an inhibition of sintering (alloying) between the Pt and Rh brought about by the separate loading of the Pt from the Rh in the small pores and large pores within the partition. It was thus confirmed based on this result that the catalytic performance could be improved by separately loading the Pt in the small pores and the Rh in the large pores within the partition.

Various examples of modifications have been provided above as examples for the particulate filter 100 and the exhaust gas purification apparatus 1 containing the particulate filter 100, but the structure of the particulate filter 100 and the structure of the exhaust gas purification apparatus 1 are not limited to or by any of the embodiments provided above.

For example, in the embodiments provided above, Pt is disposed in the small pore 18a and Rh is disposed in the large pore 18b, but there is no limitation to this. For example, Pt may be disposed in the large pore 18b and Rh may be disposed in the small pore 18a. In this case, the effects indicated above can again be obtained because the Pt and Rh are supported separately within the partition. In addition, Pd may be present in the first catalyst region 20 in place of the Pt or together with the Pt.

In addition, the shape and structure of each member and position in the exhaust gas purification apparatus 1 may also be altered. A catalyst section is located upstream from the filter section in the example given in FIG. 1, but the catalyst section may even be omitted. This exhaust gas purification apparatus 1 is particularly advantageous as an apparatus for purifying the harmful components in an exhaust gas having a relatively high exhaust temperature, for example, as in a gasoline engine. However, the exhaust gas purification apparatus 1 according to the present invention is not limited to the application of purifying the harmful components in the exhaust gases from gasoline engines and can be used in various applications for purifying the harmful components in the exhaust gases discharged from other types of engines (for example, diesel engines).

INDUSTRIAL APPLICABILITY

The present invention can provide an exhaust gas purification apparatus that can provide an improved exhaust gas purification performance and that can do so while supporting a reduction in pressure losses.

The invention claimed is:

1. An exhaust gas purification apparatus for purifying an exhaust gas discharged from the internal combustion engine and to be disposed in an exhaust passage of an internal combustion engine, the exhaust gas purification apparatus comprising:
    a substrate having a wall-flow structure, the substrate comprising:
        a porous partition that divides
            an entry-side cell in which only an exhaust gas inflow-side end part is open from
            an exit-side cell in which only an exhaust gas outflow-side end part is open; wherein
        the exit-side cell is adjacent to the entry-side cell; and
        the porous partition comprises:
            a first plurality of pores consisting of first pores having a first average pore diameter of not more than 10 μm measured by mercury porosimetry,
            a second plurality of pores consisting of second pores having a second average pore diameter of greater than 10 μm and not more than 100 μm measured by mercury porosimetry, where the second average pore diameter is larger than the first average pore diameter,
            a first catalyst region formed in the first pores, and
            a second catalyst region formed in the second pores, wherein
                the first catalyst region contains a first support and a first catalyst loaded on the first support, where the first catalyst is one or two metals selected from the group consisting of Pt, Pd, and Rh, and
                the second catalyst region contains a second support and a second catalyst loaded on the second support, wherein the second catalyst is a metal that is different from the one or two metals of the first catalyst with the proviso that the metal of the second catalyst is at least one metal selected from the group consisting of Pt, Pd, and Rh.

2. The exhaust gas purification apparatus according to claim 1, wherein
    the first catalyst contains Pt, and
    the second catalyst contains Rh.

3. The exhaust gas purification apparatus according to claim 2, wherein, per 1 L of substrate volume,
    the Pt content in the first catalyst region is 0.3 g to 1 g, and
    the Rh content in the second catalyst region is 0.1 g to 0.5 g.

4. The exhaust gas purification apparatus according to claim 2, wherein the first catalyst region contains an NOx absorber that has an NOx storage capacity.

5. The exhaust gas purification apparatus according to claim 2, wherein the second catalyst region contains an OSC material that has an oxygen storage capacity.

6. The exhaust gas purification apparatus according to claim 1, wherein the internal combustion engine is a gasoline engine.

* * * * *